3,163,160
DISPOSABLE SWAB AND CULTURE
MEDIUM DEVICE
Milton J. Cohen, 7111 Connecticut Ave.,
Chevy Chase, Md.
Filed Nov. 15, 1962, Ser. No. 237,797
3 Claims. (Cl. 128—2)

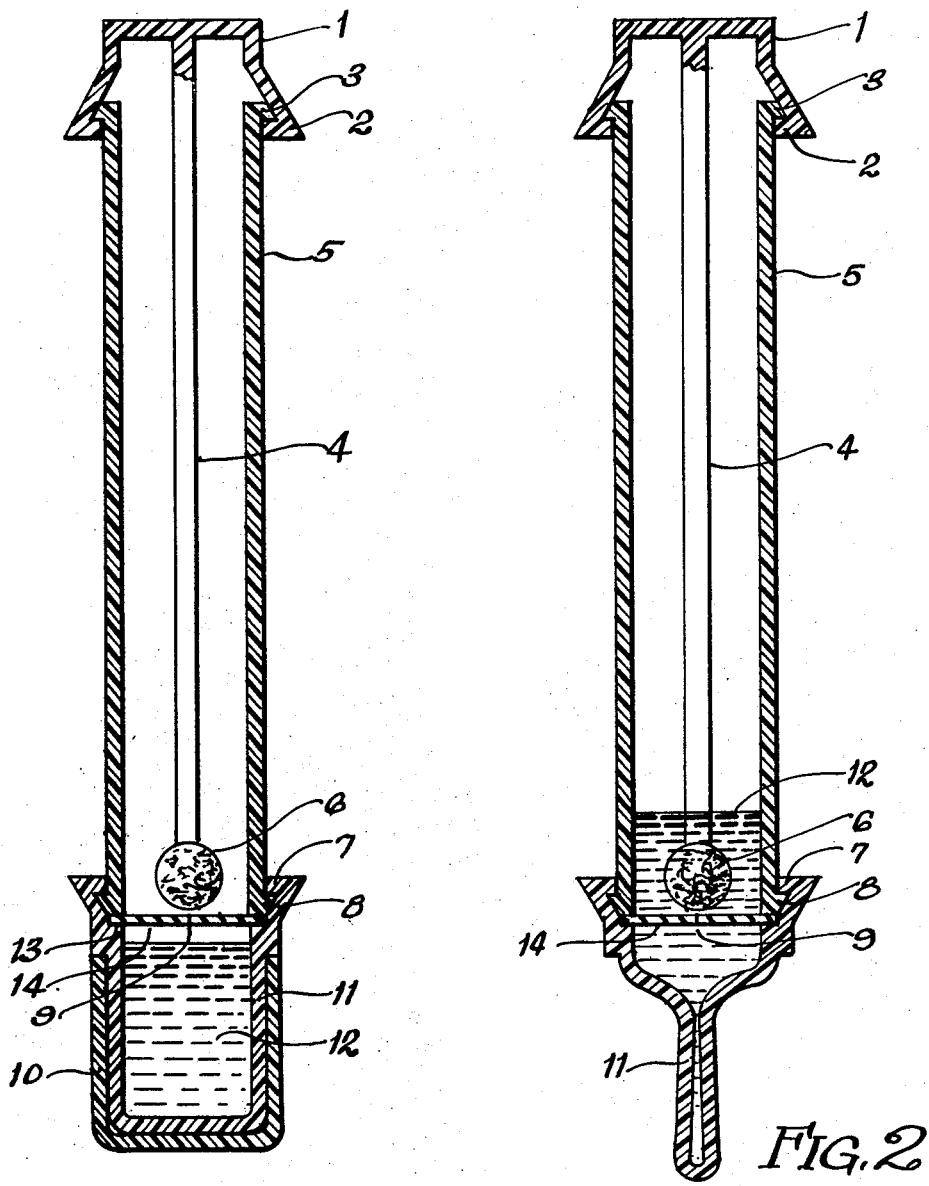

This invention relates to a disposable device housing simultaneously a sterile swab and its accompanying culture medium, both products stored out of contact with each other, and capable of being brought together at the time desired for the purpose intended.

This invention relates also to a device which is able not only to bring these two products together intimately at the time desired, but to do so solely within the device itself without outside implementation.

Another object is to be able to assemble with ease the parts concerned with this device.

Another object is to be able to contain both products completely sterile within the device while in storage before use.

Another object is to manufacture the applicator holding the swab, integrally with the cover of the device for ease of assembly.

Another object of this device is that, upon assembly, a completely sterile product results.

Another object is to present a convenient and portable means of growing cultures from the swab once said swab has contacted the tissue concerned.

Another object is not only to produce an invention accomplishing the above claims, but to do so inexpensively.

Other objects and advantages of the invention will be apparent from the following description taken in conjunction with the accompanying drawings, wherein:

FIG. 1 illustrates a longitudinal cross section of the completely assembled device showing the applicator and swab suspended independently of but adjacent to the area housing the culture medium before the device has been used.

FIG. 2 illustrates a longitudinal cross section of the completely assembled device, after use, with the culture medium having been brought into complete contact with the swab, thus allowing the smear on said swab to begin growth in said medium, said device ready to be sent to the examining laboratory for incubation.

Briefly stated, in the usual use of a swab, one is taken from a batch of sterile swabs, and then applied or rubbed against the tissue concerned to eventually secure a sample of any offending bacteria which may be present to verify a diagnosis. This being done, the swab is then placed in a sterile container, and later sent to the laboratory, where it is removed and then placed in another container such as a Petri dish, said container having a culture medium therein, after which the dish is then placed in an incubator to grow any colonies which may be present. The growth secured, samples of said growth are taken from the dish for examination. Once finished with, the dish must then be carefully cleaned and sterilized properly in order that it may be reused. The swab of course is also discarded. Although the foregoing method is effective, it is cumbersome, time wasting and complicated to insure a definite clean sterile container for future use. This invention presents a novel means of not only keeping the swab in an individual disposable container, but that container also holds the culture medium necessary for that swab, both products being housed separately within said container until time of use of the device. At the proper time the swab is used, returned to the container, brought into contact with the culture medium and the entire unit placed in the incubator, the sought for colonies grown in said culture medium right in the container. A sample is taken from that medium, and then the entire unit, the swab, the culture medium and its grown infection is immediately consigned to an incinerator for definite sterile removal. This invention then presents a device that definitely insures complete sterility for the products, ease of use, saving of labor in not having parts to clean and sterilize afterward, complete disposability, and a product which is inexpensive to produce.

With continued reference to the drawings:

FIG. 1 shows a sterile swab 6 attached to an applicator 4, said applicator being integral with the cover 1 (although the applicator could be a separate entity and be fastened to the cover 1 by any of number of ways). The cover has annular lip 2 by which said cover locks itself to the annular ledge 3 of the tube or tubular container 5. At the opposite end of said tube there is an annular ledge 8. This ledge is gripped tightly by an annular lip 7, said lip being integral with a cup-shaped receptacle 11 having walls which are flexible. Internally at the base of the annular lip 7 the wall is annularly recessed (13). Upon this recessed area 13 rests a circular self sealing rubber valve 14 having a slit 9 in its center. The locking together of the two parts, tube 5 and receptacle 11 in turn secures the valve 14 in a fixed position. Within the bulk of the receptacle 11 and below the surface of the valve 14 lies a sterile culture medium 12. The valve 14 allows the sterile swab to be kept out of contact with the culture medium 12 until so desired. Encompassing the receptacle 11 and being held closely by friction fit is a cup-shaped rigid guard 10 which prevents accidentally flexing of the walls of the receptacle 11.

In FIG. 2, the swab 6 has been removed, contacted the tissue concerned and returned to locked position within the tube 5. The guard 10 has been removed, the flexible walls of the receptacle 11 compressed which forced the culture medium 12 up and through the slit 9 of the valve 14. Once through the valve the medium has come to rest upon the inner surface of said valve, simultaneously completely enveloping the infected swab 6. The device is now ready for storage in an incubator.

In the use of the device, one grasps the tube 5 in one hand and with the other grips the cover 1, and removes the swab 6 from the interior of the tube 5 by gripping the cover 1, twisting it and lifting out said swab. The swab is then applied to the area desired after which it is then returned to the tube 5, wherein it is locked in position by closure of the cover 1. Then, still grasping the tube 5 in the one hand, with the other, the guard 10 is removed from around the receptacle 11 and set aside. By using but two fingers, the walls of the receptacle are compressed together as much as possible. This action in turn causes the enclosed culture medium 12 to be forced upward and through the slit 9 in the self sealing valve 14 where the bulk of said culture medium 12 comes to rest against the inner surface of the valve 14. Simultaneously, as the culture medium 12 flows through and comes to rest, it has completely enveloped the infected swab 6. Due to the nature of the self sealing valve 14 the encompassing culture medium will not flow back into the receptacle 11. Only pressure from within the tube 5 would make it do so, and this is impossible since the tube does not develop pressure once it is actuated. The entire device, including the swab now immersed in its culture medium, is then ready to be placed into an incubator to allow the bacteria placed in the medium by the infected swab to grow. Then the swab is removed, samples of colonies are taken from the medium and then both the swab and the container, tube, receptacle and medium are thrown into an incinerator, since all parts concerned consist of rubber, plastic, cotton and a viscous liquid. The entire device is then destroyed, eliminating any chance of infected material remaining, since the device is a one-use throw-away item, and there is no "cleaning up" to be done.

It will be obvious to those skilled in the art, that various changes may be made in the invention without departing from the spirit and scope thereof, the invention is not limited by that which is illustrated in the drawings and described in the specification, but only as indicated in the accompanying claims.

I claim:

1. The combination consisting of a disposable sample swab and culture medium device, comprising a tubular container open at both ends, a cover at one end, means for removably securing said cover to said one end, an applicator rod, a sterile swab attached to said rod whereby said swab is held suspended within said container when said cover is secured in place, a flexible receptacle, means for securing said receptacle at the other end of said container, a slitted self-sealing valve secured adjacent said other end and separating the interior of said receptacle from the interior of said container, and a liquid culture medium disposed within said receptacle, whereby said swab and cover can be removed from said container for application of a sample to said swab, and whereby said swab and cover can be thereafter resecured to said container, said culture medium can be forced through said slit by collapsing the walls of said receptacle, and whereby said combination can be discarded when bacterial growth within the device is completed.

2. The combination consisting of a disposable sample swab and culture medium device comprising a container, a detachable cover at one end of said container, an applicator rod integrally attached to said cover, a swab attached to said rod whereby the swab will be suspended within the container when said cover is in place, a flexible receptacle attached to the other end of said container, a liquid culture medium within said receptacle, a slitted self-sealing valve separating said culture medium from said swab, and a rigid removable encasement embracing said receptacle, said encasement when removed exposing said receptacle whereby the walls of the receptacle can be compressed to pass said liquid through said valve for immersion of said swab in said liquid.

3. A combination in accordance with claim 2 including an external annular bead formed at said one end of said container, said cover having an internal annular recess whereby the cover can be secured to said one end, said receptacle having an internal annular recess and an external annular bead formed at the other end of said container whereby said receptacle can be locked to said container by friction fitting of recess over said bead, and an internal annular shoulder defined by said receptacle, said valve being adapted to fit between said shoulder and the end edge of said container for locking of said valve in place.

References Cited by the Examiner

UNITED STATES PATENTS

| 726,038 | 4/03 | Fitzsimmons | 128—231 |
| 1,676,881 | 7/28 | Anthony | 128—216 |
| 2,787,269 | 4/57 | Cohen | 128—272 |
| 2,835,246 | 5/58 | Boettger | 128—2 |
| 3,091,240 | 5/63 | McConnaughey et al. | 128—218 |

FOREIGN PATENTS 285,835  7/15  Germany.

RICHARD A. GAUDET, *Primary Examiner.*

JORDAN FRANKLIN, LOUIS R. PRINCE, *Examiners.*